US012732220B2

(12) United States Patent
Gao et al.

(10) Patent No.: US 12,732,220 B2
(45) Date of Patent: Sep. 8, 2026

(54) RADIO FREQUENCY RECEIVING CIRCUIT AND CHIP COMPRISING THE SAME

(71) Applicant: REALTEK SEMICONDUCTOR CORP., Hsinchu (TW)

(72) Inventors: Ruo-Hsuan Gao, Hsinchu (TW); Chia-Yi Lee, Hsinchu (TW); Chia-Jun Chang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 495 days.

(21) Appl. No.: 18/381,334

(22) Filed: Oct. 18, 2023

(65) Prior Publication Data

US 2024/0137061 A1 Apr. 25, 2024
US 2024/0235597 A9 Jul. 11, 2024

(30) Foreign Application Priority Data

Oct. 20, 2022 (TW) ................................. 111139931

(51) Int. Cl.
*H04B 1/18* (2006.01)
*H04B 1/16* (2006.01)

(52) U.S. Cl.
CPC ............. *H04B 1/18* (2013.01); *H04B 1/1607* (2013.01)

(58) Field of Classification Search
CPC ........... H04B 1/18; H04B 1/1607; H04B 1/16
See application file for complete search history.

(56) References Cited

U.S. PATENT DOCUMENTS 5,825,254 A * 10/1998 Lee ........................... H03L 7/16 455/313
5,862,463 A * 1/1999 Peterson .................. H04B 1/18 455/313
8,369,819 B2 * 2/2013 Zhou .................. G06K 19/0723 455/313
9,112,483 B1 * 8/2015 Delos ..................... H03B 19/12
12,021,539 B1 * 6/2024 Crooks ..................... H03L 7/18
2004/0106390 A1 * 6/2004 Oh ....................... H04N 5/4446 455/313

(Continued)

FOREIGN PATENT DOCUMENTS

EP 0750403 A2 * 12/1996 ............... H04B 1/10

*Primary Examiner* — Lewis G West
(74) *Attorney, Agent, or Firm* — Birch, Stewart, Kolasch & Birch, LLP

(57) ABSTRACT

A radio frequency receiving circuit includes a first amplification circuit, an oscillation circuit, a frequency mixing and amplification circuit and a dividing circuit. The first amplification circuit is configured to amplify an input signal so as to generate an amplified input signal. The oscillation circuit is configured to provide a local oscillation signal. The frequency mixing and amplification circuit is configured to mix and amplify the amplified input signal according to the local oscillation signal. The dividing circuit is configured to form a dividing loop at a preset frequency for the amplified input signal according to the local oscillation signal when the dividing circuit is driven. A chip including the radio frequency receiving circuit and a main circuit is also provided. The main circuit is configured to drive the dividing circuit when the second input signal is determined to include a signal of the preset frequency.

20 Claims, 6 Drawing Sheets

(56) References Cited

U.S. PATENT DOCUMENTS

| | | | | |
|---|---|---|---|---|
| 2007/0032215 | A1* | 2/2007 | Oba | H03F 1/0261<br>455/313 |
| 2009/0203348 | A1* | 8/2009 | Nishimura | H04B 7/0877<br>455/341 |
| 2016/0006098 | A1* | 1/2016 | Hasegawa | H01P 5/16<br>455/286 |
| 2018/0054221 | A1* | 2/2018 | Regev | H04B 1/18 |
| 2019/0181888 | A1* | 6/2019 | Naito | H03D 7/166 |

* cited by examiner

RADIO FREQUENCY RECEIVING CIRCUIT AND CHIP COMPRISING THE SAME

CROSS-REFERENCE TO RELATED APPLICATION

This non-provisional application claims priority under 35 U.S.C. § 119(a) to Patent Application No. 111139931 filed in Taiwan, R.O.C. on Oct. 20, 2022, the entire contents of which are hereby incorporated by reference.

BACKGROUND

Technical Field

The instant disclosure is related to radio frequency receiving technology, especially a radio frequency receiving circuit and chip comprising the same that save power consumption.

Related Art

For general radio frequency receivers, when receiving a radio frequency signal from an antenna, if the frequency of the radio frequency signal does not conform to the operating frequency of the radio frequency receiver, interference may occur. In order to address this issue, an additional bandpass filtering path may be added between the low-noise amplifier (LNA) and the mixer of the radio frequency receiver to cancel out the interference.

However, for the aforementioned radio frequency filtering circuit, two buffers are used. One buffer is used to provide a local oscillation source signal for the mixer through a local oscillation source circuit, and the other buffer is used to provide the local oscillation source signal for the bandpass filtering circuit through the local oscillation source circuit. This type of radio frequency receiver has the issue of excessive power consumption.

SUMMARY

In an embodiment, a radio frequency receiving circuit comprises a first amplification circuit, an oscillation circuit, a frequency mixing and amplification circuit, and a dividing circuit. The first amplification circuit is configured to amplify an input signal to generate an amplified input signal. The oscillation circuit is configured to provide a local oscillation signal. The frequency mixing and amplification circuit is coupled to the first amplification circuit and configured to perform frequency mixing and amplification on the amplified input signal according to the local oscillation signal. The dividing circuit is coupled to a coupling point between the first amplification circuit and the frequency mixing and amplification circuit and configured to form a dividing loop for the amplified input signal at a preset frequency according to the local oscillation signal when the dividing circuit is driven.

In an embodiment, the dividing circuit comprises a bandpass filtering circuit and a control circuit. The bandpass filtering circuit comprises a dividing loop. The control circuit is configured to selectively activate the bandpass filtering circuit, when the control circuit is driven, the control circuit activates the bandpass filtering circuit so that the bandpass filtering circuit forms the dividing loop for the amplified input signal at the preset frequency according to the local oscillation signal.

In an embodiment, the bandpass filtering circuit comprises a wave mixing circuit and a capacitor circuit; an impedance of the wave mixing circuit and a capacitance of the capacitor circuit conform to the preset frequency.

In an embodiment, the first amplification circuit comprises a front end amplification circuit and a coil circuit. The front end amplification circuit is configured to amplify the input signal so as to generate an amplified input signal and transmit the amplified input signal to the coil circuit. The coil circuit comprises a central tap. The capacitor circuit comprises a capacitor. The wave mixing circuit comprises a first transistor and a second transistor; a first end of the first transistor and a first end of the second transistor are coupled to two output ends of the coil circuit, respectively. The first end of the first transistor and the first end of the second transistor are configured to receive the amplified input signal from the two output ends of the coil circuit; a control end of the first transistor and a control end of the second transistor are coupled to the oscillation circuit and are configured to receive the local oscillation signal; a second end of the first transistor and a second end of the second transistor are coupled to two ends of the capacitor, respectively; when the control circuit is driven, the control circuit provides a first preset voltage for the control end of the first transistor, the control end of the second transistor, the second end of the first transistor, the second end of the second transistor, and the central tap so as to conduct the wave mixing circuit and the capacitor circuit and so that the wave mixing circuit and the capacitor circuit form the dividing loop.

In an embodiment, when the control circuit is not driven, the control circuit provides the first preset voltage for the control end of the first transistor and the control end of the second transistor and provides a second preset voltage for the second end of the first transistor, the second end of the second transistor, and the central tap so as to cut off the dividing loop.

In an embodiment, a chip comprises a radio frequency receiving circuit and a main circuit. The radio frequency receiving circuit comprises a first amplification circuit, an oscillation circuit, a frequency mixing and amplification circuit, and a dividing circuit. The first amplification circuit is configured to amplify an input signal to generate an amplified input signal. The oscillation circuit is configured to provide a local oscillation signal. The frequency mixing and amplification circuit is coupled to the first amplification circuit and configured to perform frequency mixing and amplification on the amplified input signal according to the local oscillation signal so as to output a second input signal. The dividing circuit is coupled to a coupling point between the first amplification circuit and the frequency mixing and amplification circuit and configured to form a dividing loop for the amplified input signal at a preset frequency according to the local oscillation signal when the dividing circuit is driven. The main circuit is configured to drive the dividing circuit when the second input signal is determined to comprise a signal of the preset frequency.

In the following detailed description, the detailed features and advantages of the invention of the instant disclosure will be described in detail. The content is sufficient for any person skilled in the art to understand the technical context of the instant disclosure and implement the invention accordingly. Besides, according to the content disclosed in the specification, claims, and drawings, any person skilled in the art can easily understand the goal and advantages of the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
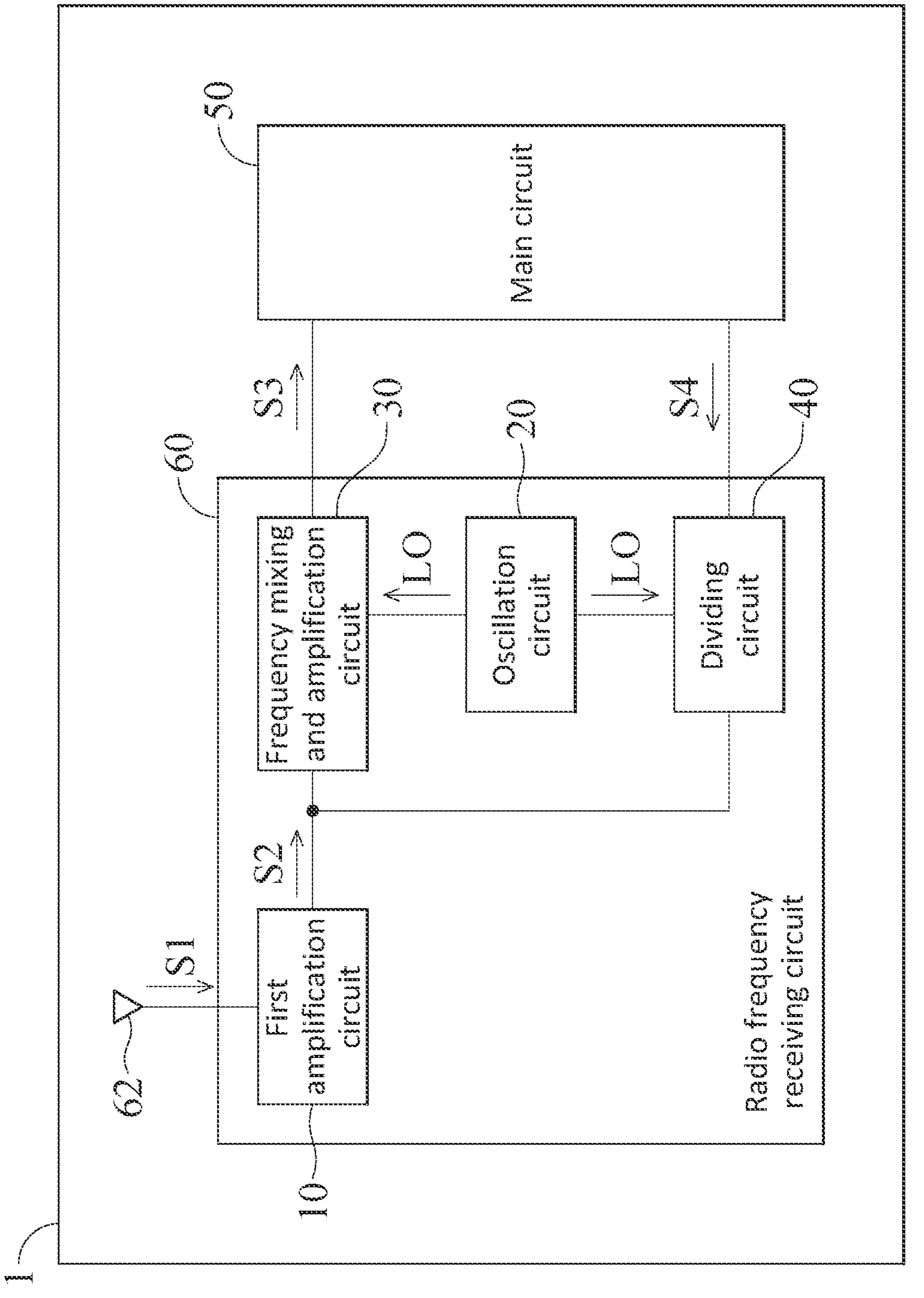
FIG. 1 illustrates a schematic block diagram of an embodiment of an antenna, a radio frequency receiving circuit, and a main circuit of a chip.

FIG. 1 illustrates a schematic block diagram of an embodiment of an antenna 62, a radio frequency receiving circuit 60, and a main circuit 50 of a chip 1. Please refer to FIG. 1. The chip 1 comprises the radio frequency receiving circuit 60 and the main circuit 50. The radio frequency receiving circuit 60 is electrically connected to the main circuit 50. In an embodiment, the chip 1 further comprises the antenna 62. The antenna 62 is electrically connected to the radio frequency receiving circuit 60. In an embodiment, the antenna 62 is located outside the chip 1 and electrically connected to the radio frequency receiving circuit 60.

The radio frequency receiving circuit 60 comprises a first amplification circuit 10, an oscillation circuit 20, a frequency mixing and amplification circuit 30, and a dividing circuit 40. The first amplification circuit 10 is coupled to the antenna 62 and the frequency mixing and amplification circuit 30. The oscillation circuit 20 is coupled to the frequency mixing and amplification circuit 30 and the dividing circuit 40. The dividing circuit 40 is coupled to a coupling point between the first amplification circuit 10 and the frequency mixing and amplification circuit 30.

The first amplification circuit 10 is configured to receive an input signal S1 transmitted by the antenna 62, amplify the input signal S1 so as to generate an amplified input signal S2 and transmit the amplified input signal S2 to the frequency mixing and amplification circuit 30 and the dividing circuit 40.

The oscillation circuit 20 is configured to provide a local oscillation signal LO for the frequency mixing and amplification circuit 30 and the dividing circuit 40. In some embodiments, the local oscillation signal LO may be, but not limited to, a sinusoidal (sin) wave.

The frequency mixing and amplification circuit 30 is configured to perform frequency mixing and amplification on the amplified input signal S2 according to the local oscillation signal LO so as to generate a second input signal S3 and transmit the second input signal S3 to the main circuit 50.

The dividing circuit 40 is configured to form a dividing loop L1 for the amplified input signal S2 at a preset frequency FR according to the local oscillation signal LO when the dividing circuit 40 is driven. In some embodiments, the main circuit 50 selectively drives the dividing circuit 40 according to the frequency of the second input signal S3. For example, the main operating frequency range of the main circuit 50 is 2.5 GHz, and the preset frequency FR is 2.8 GHz. This preset frequency is generally a frequency that can easily interfere with the main frequency. When the main circuit 50 determines that the second input signal S3 contains a 2.8-GHz signal (or when the main circuit 50 detects that the 2.8-GHz signal within the second input signal S3 is greater than a preset value), the main circuit 50 transmits a driving signal S4 to drive the dividing circuit 40 and thus activate the dividing circuit 40, so that the dividing circuit 40 divides (shunts) the 2.8-GHz signal within the amplified input signal S3 toward the dividing circuit 40. As a result, the amplified input signal S2 that will eventually be received by the main circuit 50 no longer contains the 2.8-GHz signal, and thus the main circuit 50 will not be interfered by the 2.8-GHz signal. On the contrary, if the second input signal S3 received by the main circuit 50 does not contain the 2.8-GHz signal, the main circuit 50 does not transmit the driving signal S4, and thus the dividing circuit 40 will not be driven, and therefore the dividing loop L1 is cut off. In some embodiments, the aforementioned state of not transmitting the driving signal S4 may alternatively be a state of transmitting a "non-driving signal" so as not to activate the dividing circuit 40. Besides, when the main circuit 50 has already activated the dividing circuit 40, because the dividing circuit 40 has already divided (shunted) the signals of the preset frequency FR from the amplified input signal S2, the main circuit 50 can no longer learn whether the amplified input signal S2 still contains signals of the preset frequency FR before being divided. At this time, the main circuit 50 may intermittently (once in a while) cut off the dividing circuit L1 to perform the determination and then determine whether to keep activating the dividing circuit 40.

In some embodiments, the preset frequency FR may be, but not limited to, 2.8 GHz. Because the dividing circuit 40 can form the dividing loop L1 when the dividing circuit 40 is driven and can cut off the dividing loop L1 when the dividing circuit 40 is not driven, the oscillation circuit 20 does not need to respectively output the local oscillation signal LO to the frequency mixing and amplification circuit 30 and the dividing circuit 40. In other words, in some embodiments, the oscillation circuit 20 does not need to be configured with two buffers, and the oscillation circuit 20 can utilize just a single buffer to provide the local oscillation signal LO for the frequency mixing and amplification circuit 30 and the dividing circuit 40, so that the effect of power saving can be further achieved.

Figure 2:
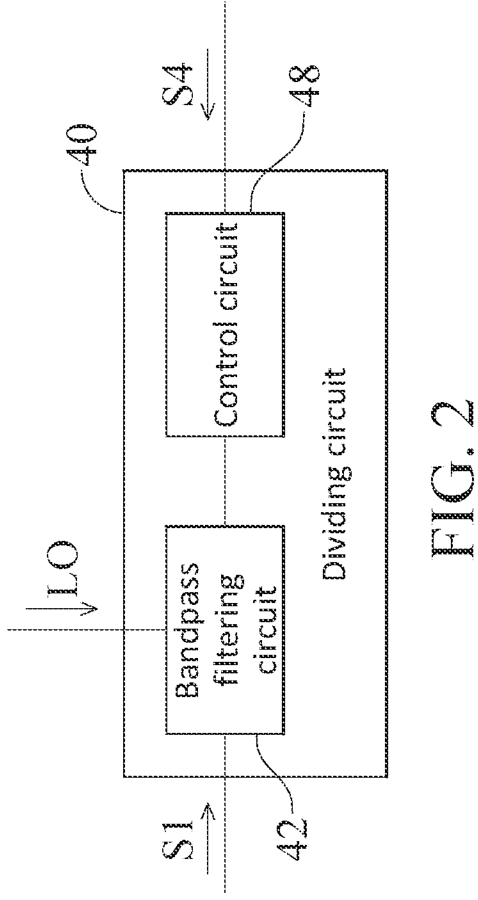
FIG. 2 illustrates a schematic block diagram of an embodiment of a dividing circuit of a radio frequency receiving circuit.

FIG. 2 illustrates a schematic block diagram of an embodiment of the dividing circuit 40 of the radio frequency receiving circuit 60. Please refer to FIG. 1 and FIG. 2. In some embodiments, the dividing circuit 40 comprises a bandpass filtering circuit 42 and a control circuit 48. The bandpass filtering circuit 42 comprises the dividing loop L1. The control circuit 48 is configured to selectively activate the bandpass filtering circuit 42. When the control circuit 48 is driven, the control circuit 48 activates the bandpass filtering circuit 42, so as to make the bandpass filtering circuit 42 form the dividing loop L1 for the amplified input signal S2 at the preset frequency FR according to the local oscillation signal LO.

Figure 3:
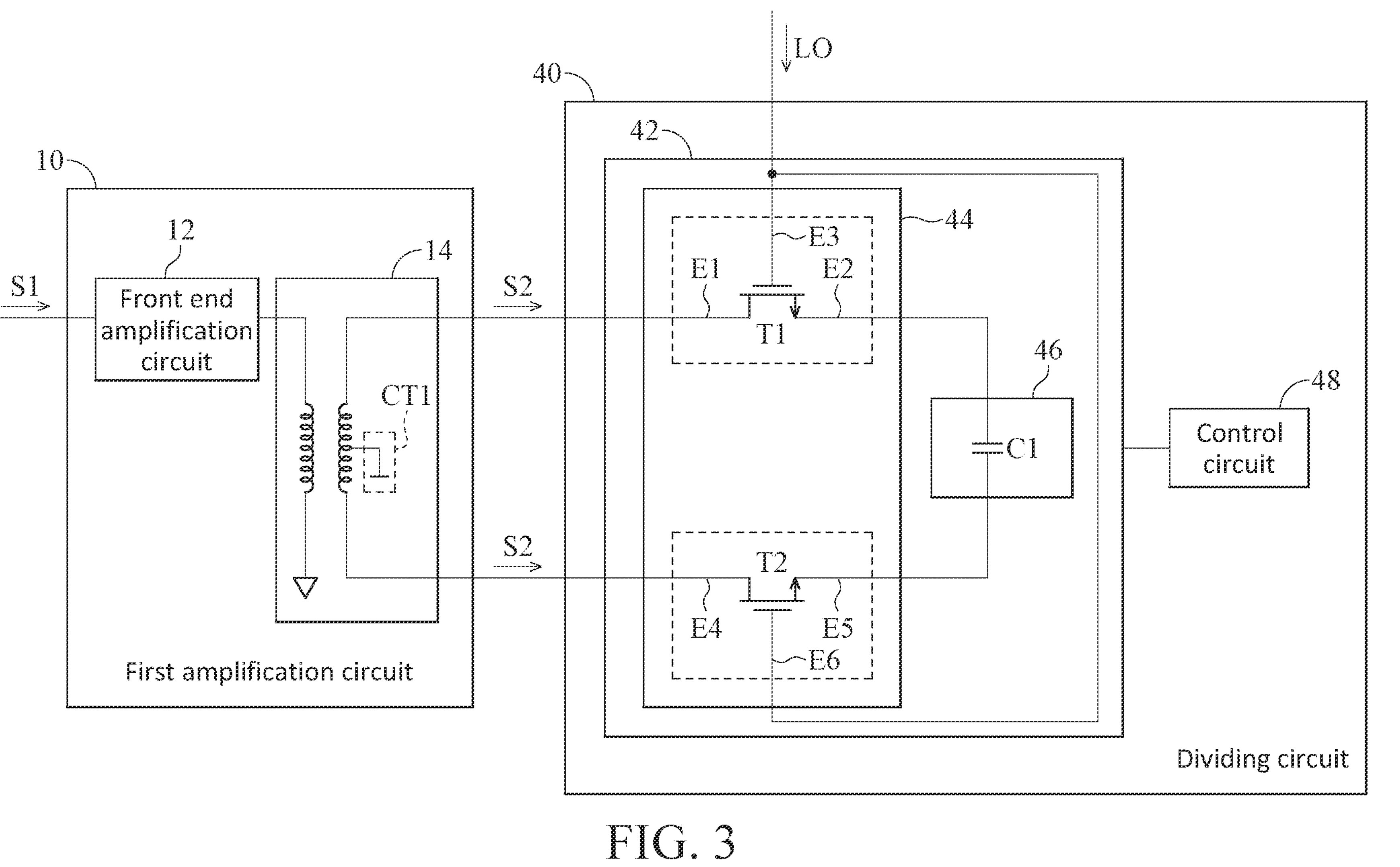
FIG. 3 illustrates a schematic circuit diagram of an embodiment of a first amplification circuit and a dividing circuit of a radio frequency receiving circuit.

FIG. 3 illustrates a schematic circuit diagram of an embodiment of a first amplification circuit 10 and the dividing circuit 40 of the radio frequency receiving circuit 60. Please refer to FIG. 1, FIG. 2, and FIG. 3. In some embodiments, the first amplification circuit 10 comprises a front end amplification circuit 12 and a coil circuit 14. The front end amplification circuit 12 is configured to amplify the input signal S1 and transmit the amplified input signal S2 to the coil circuit 14. In some embodiments, the front end amplification circuit 12 may be, but not limited to, a low-noise amplifier. The coil circuit 14 is configured to transmit the amplified input signal S2 to the frequency mixing and amplification circuit 30 and the dividing circuit 40. The coil circuit 14 comprises a central tap CT1.

In some embodiments, the bandpass filtering circuit 42 comprises a wave mixing circuit 44 and a capacitor circuit 46. The impedance R of the wave mixing circuit 44 and the capacitance C of the capacitor circuit 46 conform to the preset frequency FR. The impedance R, the capacitance C, and the preset frequency FR have the following relationship. $FR=1/2\pi RC$. For example, the preset frequency FR is set at 2.8 GHz. Hence, from the equation $FR=1/2\pi RC$, it can be learned that the product of the impedance R and the capacitance C is $1/2\pi(2.8*10^9)$. The user may adjust the impedance R and the capacitance C according to the preset frequency FR to conform to the requirement regarding the preset frequency FR. For example, if the product of the impedance R and the capacitance C is the aforementioned value $1/2\pi(2.8*10^9)$, the impedance R and the capacitance C may be 1Ω and 57 pF, respectively.

In some embodiments, the wave mixing circuit 44 comprises a first transistor T1 and a second transistor T2. A first end E1 of the first transistor T1 and a first end E4 of the second transistor T2 are coupled to two output ends of the coil circuit 14, respectively. The first end E1 of the first transistor T1 and the first end E4 of the second transistor T2 are configured to receive the amplified input signal S2 from the two output ends of the coil circuit 14. A control end E3 of the first transistor T1 and a control end E6 of the second transistor T2 are coupled to the oscillation circuit 20 and are configured to receive the local oscillation signal LO. The capacitor circuit 46 comprises a capacitor C1, and a second end E2 of the first transistor T1 and a second end E5 of the second transistor T2 are coupled to two ends of the capacitor C1, respectively. In some embodiments, the first transistor T1 and the second transistor T2 may be, but not limited to, P-type transistors (PMOS), N-type transistors (NMOS), bipolar junction transistors (BJT), or insulated-gate bipolar transistors (IGBT). For example, if the first transistor T1 and the second transistor T2 are PMOS, the first end E1 of the first transistor T1 and the first end E4 of the second transistor T2 are drains, the second end E2 of the first transistor T1 and the second end E5 of the second transistor T2 are sources, and the control end E3 of the first transistor T1 and the control end E6 of the second transistor T2 are gates. In some embodiments, the wave mixing circuit 44 may be, but not limited to, a passive frequency mixer, a single-balanced frequency mixer, or a double-balanced frequency mixer.

In some embodiments, the first transistor T1 and the second transistor T2 are both NMOS. In this scenario, when the control circuit 48 is driven, the control circuit 48 provides a first preset voltage V1 for the control end E3 of the first transistor T1, the control end E6 of the second transistor T2, the second end E2 of the first transistor T1, the second end E5 of the second transistor T2, and the central tap CT1. During this time, the voltage $V_{E1E2}$ across the first end E1 of the first transistor T1 and the second end E2 of the first transistor T1 is 0 V, the DC bias of the control end E3 of the first transistor T1 is the first preset voltage V1, and the control end E3 of the first transistor T1 is configured to receive the local oscillation signal LO so that the first transistor T1 is turned on according to the amplitude of the local oscillation signal LO. Similarly, during this time, the voltage $V_{E4E5}$ across the first end E4 of the second transistor T2 and the second end E5 of the second transistor T2 is 0 V, the DC bias of the control end E6 of the second transistor T2 is the first preset voltage V1, and the control end E6 of the second transistor T2 is configured to receive the local oscillation signal LO so that the second transistor T2 is turned on according to the amplitude of the local oscillation signal LO. As described in the example, if the first preset voltage V1 is 0 V, when the control circuit 48 is driven, the control circuit 48 provides 0 V for the control end E3 of the first transistor T1, the control end E6 of the second transistor T2, the second end E2 of the first transistor T1, the second end E5 of the second transistor T2, and the central tap CT1. During this time, the voltage at the first end E1 of the first transistor T1 is 0 V, and the voltage at the second end E2 of the first transistor T1 is 0 V. As a result, the voltage $V_{E1E2}$ across the first end E1 of the first transistor T1 and the second end E2 of the first transistor T1 is 0 V. However, although the DC bias of the control end E3 of the first transistor T1 is 0 V, because the control end E3 of the first transistor T1 is configured to receive the local oscillation signal LO, the first transistor T1 will be turned on according to the amplitude of the local oscillation signal LO. Similarly, during this time, the voltage at the first end E4 of the second transistor T2 is 0 V. and the voltage at the second end E5 of the second transistor T2 is 0 V. As a result, the voltage $V_{E4E5}$ across the first end E4 of the second transistor T2 and the second end E5 of the second transistor T2 is 0 V. However, although the DC bias of the control end E6 of the second transistor T2 is 0 V, because the control end E6 of the second transistor T2 is configured to receive the local oscillation signal LO, the second transistor T2 will be turned on according to the amplitude of the local oscillation signal LO. In some embodiments, the first preset voltage V1 may be, but not limited to, 0 V.

In other words, in some embodiments, when the control circuit 48 is driven, the control circuit 48 provides the first preset voltage V1 for the control end E3 of the first transistor T1, the control end E6 of the second transistor T2, the second end E2 of the first transistor T1, the second end E5 of the second transistor T2, and the central tap CT1 so as to conduct the wave mixing circuit 44 and the capacitor circuit 46 so that the wave mixing circuit 44 and the capacitor circuit 46 form the dividing loop L1. That is to say that, in this embodiment, the combination of the wave mixing circuit 44 and the capacitor circuit 46 is the dividing loop L1.

When the control circuit 48 is not driven, the control circuit 48 provides the first preset voltage V1 for the control end E3 of the first transistor T1 and the control end E6 of the second transistor T2 and provides a second preset voltage V2 for the second end E2 of the first transistor T1, the second end E5 of the second transistor T2, and the central tap CT1, wherein the first preset voltage V1 is less than the second preset voltage V2. During this time, the voltage $V_{E1E2}$ across the first end E1 of the first transistor T1 and the second end E2 of the first transistor T1 is 0 V. and the voltage $V_{E3E2}$ across the control end E3 of the first transistor T1 and the second end E2 of the first transistor T1 is the difference between the first preset voltage V1 and the second preset voltage V2. Because the first preset voltage V1 is less than the second preset voltage V2, the voltage $V_{E3E2}$ across the control end E3 of the first transistor T1 and the second end E2 of the first transistor T1 is negative, and thus the first transistor T1 is not turned on. Similarly, during this time, the voltage $V_{E4E5}$ across the first end E4 of the second transistor T2 and the second end E5 of the second transistor T2 is 0 V, and the voltage $V_{E6E5}$ across the control end E6 of the second transistor T2 and the second end E5 of the second transistor T2 is the difference between the first preset voltage V1 and the second preset voltage V2. Because the first preset voltage V1 is less than the second preset voltage V2, the voltage $V_{E6E5}$ across the control end E6 of the second transistor T2 and the second end E5 of the second transistor T2 is negative, and thus the second transistor T2 is not turned on. For example, if the first preset voltage V1 is 0 V and the second preset voltage V2 is 1.2 V, when the control circuit 48 is not driven, the control circuit 48 provides 0 V for the control end E3 of the first transistor T1 and the control end E6 of the second transistor T2 and provides 1.2 V for the second end E2 of the first transistor T1, the second end E5 of the second transistor T2, and the central tap CT1. During this time, the voltage $V_{E1E2}$ across the first end E1 of the first transistor T1 and the second end E2 of the first transistor T1 is 0 V, the voltage $V_{E3E2}$ across the control end E3 of the first transistor T1 and the second end E2 of the first transistor T1 is −1.2 V. and thus the first transistor T1 is not turned on. Similarly, during this time, the voltage $V_{E4E5}$ across the first end E4 of the second transistor T2 and the second end E5 of the second transistor T2 is 0 V, the voltage $V_{E6E5}$ across the control end E6 of the second transistor 12 and the second end E5 of the second transistor T2 is −1.2 V, and thus the second transistor T2 is not turned on. In some embodiments, the second preset voltage V2 may be, but not limited to, 1.2 V.

In other words, in some embodiments, when the control circuit 48 is not driven, the control circuit 48 provides the first preset voltage V1 for the control end E3 of the first transistor T1 and the control end E6 of the second transistor T2 and provides a second preset voltage V2 for the second end E2 of the first transistor T1, the second end E5 of the second transistor T2, and the central tap CT1 so as to cut off the dividing loop L1.

Figure 4:
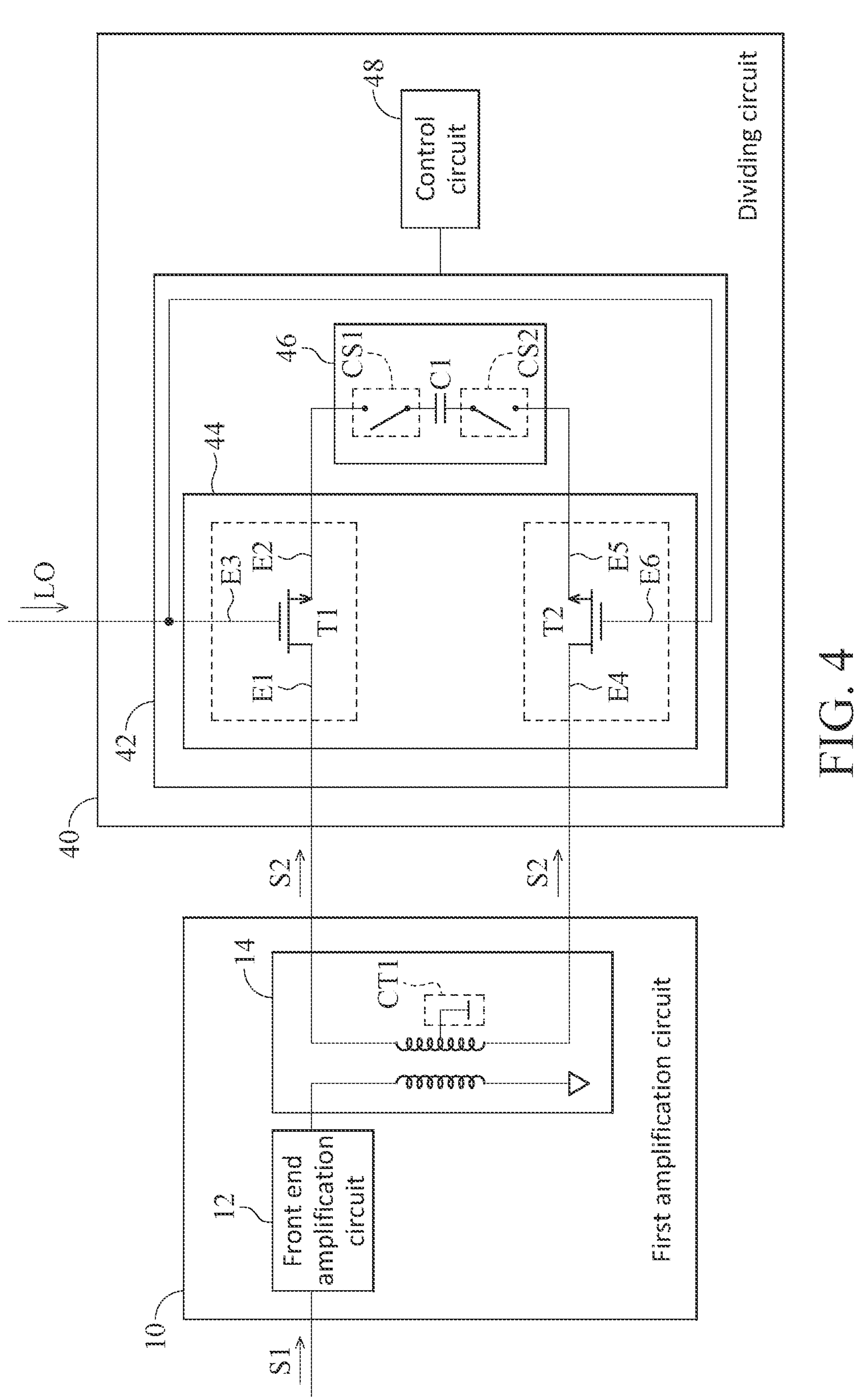
FIG. 4 illustrates a schematic circuit diagram of another embodiment of a first amplification circuit and a dividing circuit of a radio frequency receiving circuit.

FIG. 4 illustrates a schematic circuit diagram of another embodiment of the first amplification circuit 10 and the dividing circuit 40 of the radio frequency receiving circuit 60. Please refer to FIG. 1, FIG. 2, and FIG. 4. In some embodiments, the capacitor circuit 46 further comprises a first switch CS1 and a second switch CS2, the second end E2 of the first transistor T1 is coupled to one of the two ends of the capacitor C1 through the first switch CS1, the second end E5 of the second transistor T2 is coupled to the other one of the two ends of the capacitor C1 through the second switch CS2.

When the control circuit 48 is driven, the control circuit 48 provides the first preset voltage V1 for the control end E3 of the first transistor T1, the control end E6 of the second transistor T2, the second end E2 of the first transistor T1, the second end E5 of the second transistor T2, and the central tap CT1, and the control circuit 48 turns on the first switch CS1 and the second switch CS2 so as to conduct the wave mixing circuit 44 and the capacitor circuit 46 and so that the wave mixing circuit 44 and the capacitor circuit 46 form the dividing loop L1.

When the control circuit 48 is not driven, the control circuit 48 turns off the first switch CS1 and the second switch CS2. During this time, due to the cut-off of the first switch CS1 and the second switch CS2, the first transistor T1 and the second transistor T2 are not connected to the capacitor C1. In other words, in some embodiments, the control circuit 48 turns off the first switch CS1 and the second switch CS2 so as to cut off the dividing loop LL.

In some embodiments, when the control circuit 48 is not driven, the control circuit 48 provides the first preset voltage V1 for the control end E3 of the first transistor T1 and the control end E6 of the second transistor T2, provides a second preset voltage V2 for the second end E2 of the first transistor T1, the second end E5 of the second transistor T2, and the central tap CT1, and the control circuit 48 turns off the first switch CS1 and the second switch CS2 so as to cut off the dividing loop L1.

Figure 5:
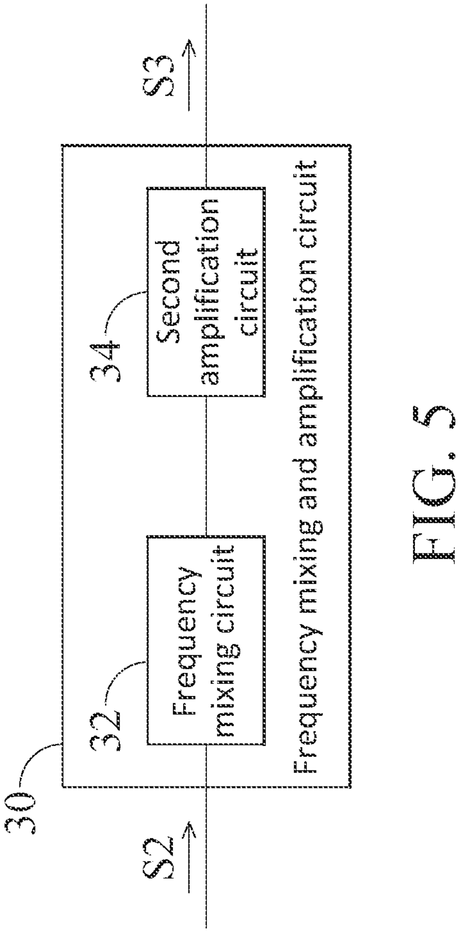
FIG. 5 illustrates a schematic block diagram of an embodiment of a frequency mixing and amplification circuit of the radio frequency receiving circuit.

FIG. 5 illustrates a schematic block diagram of an embodiment of the frequency mixing and amplification circuit 30 of the radio frequency receiving circuit 60. Please refer to FIG. 1 and FIG. 5. In some embodiments, the frequency mixing and amplification circuit 30 comprises a frequency mixing circuit 32 and a second amplification circuit 34.

The frequency mixing circuit 32 is configured to generate a second input signal S3 according to the amplified input signal S2 and the local oscillation signal LO. In some embodiments, the frequency mixing circuit 32 may be, but not limited to, a passive frequency mixer, a single-balanced frequency mixer, or a double-balanced frequency mixer.

The second amplification circuit 34 is coupled to the frequency mixing circuit 32 and configured to amplify the second input signal S3. In some embodiments, the second amplification circuit 34 may be, but not limited to, a trans-impedance amplifier or a variable-gain amplifier.

Figure 6:
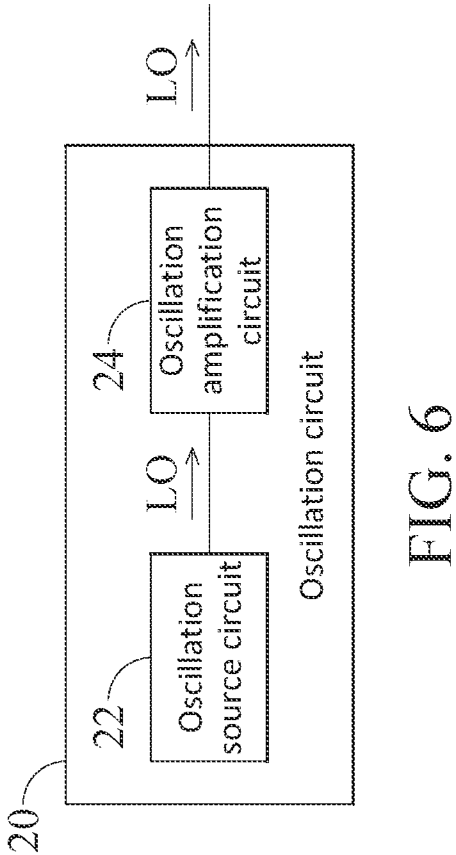
FIG. 6 illustrates a schematic block diagram of an embodiment of an oscillation circuit of a radio frequency receiving circuit.

FIG. 6 illustrates a schematic block diagram of an embodiment of the oscillation circuit 20 of the radio frequency receiving circuit 60. In some embodiments, the oscillation circuit 20 comprises an oscillation source circuit 22 and an oscillation amplification circuit 24. The oscillation source circuit 22 is configured to generate the local oscillation signal LO. The oscillation amplification circuit 24 is coupled to the oscillation source circuit 22 and configured to amplify the local oscillation signal LO. In some embodiments, the oscillation amplification circuit 24 may be, but not limited to, a buffer.

For example, in some embodiments, if the oscillation amplification circuit 24 is a buffer, because the dividing loop L1 can be formed when the control circuit 48 is driven and the dividing loop L1 can be cut off when the control circuit 48 is not driven, the oscillation amplification circuit 24 does not need to respectively output the local oscillation signal LO to the frequency mixing and amplification circuit 30 and the dividing circuit 40. In some embodiments, the oscillation amplification circuit 24 just needs to have one buffer, and this buffer can be used to output the local oscillation signal LO to the frequency mixing and amplification circuit 30 and output the local oscillation signal LO to the dividing circuit 40 at the same time.

As above, in some embodiments, because the control circuit 48 of the radio frequency receiving circuit 60 enables the wave mixing circuit 44 and the capacitor circuit 46 to form the dividing loop L1 when the control circuit 48 is driven, and the control circuit 48 cuts off the dividing loop L1 when control circuit 48 is not driven, the radio frequency receiving circuit 60 has the ability to activate or deactivate the bandpass filtering circuit 42, thus the oscillation amplification circuit 24 just needs to have one buffer, and therefore the effect of power saving can be achieved.

Although the technical context of the instant disclosure has been disclosed with the preferred embodiments above, the embodiments are not meant to limit the instant disclosure. Any adjustment and retouch done by any person skill in the art without deviating from the spirit of the instant disclosure shall be covered by the scope of the instant disclosure. Therefore, the protected scope of the instant disclosure shall be defined by the attached claims.

What is claimed is:

1. A radio frequency receiving circuit, comprising:

a first amplification circuit configured to amplify an input signal to generate an amplified input signal;

an oscillation circuit configured to provide a local oscillation signal;

a frequency mixing and amplification circuit coupled to the first amplification circuit and configured to perform frequency mixing and amplification on the amplified input signal according to the local oscillation signal; and a dividing circuit coupled to a coupling point between the first amplification circuit and the frequency mixing and amplification circuit, wherein the dividing circuit is configured to form a dividing loop for the amplified input signal at a preset frequency according to the local oscillation signal when the dividing circuit is driven.

2. The radio frequency receiving circuit according to claim 1, wherein the dividing circuit comprises a bandpass filtering circuit and a control circuit, the bandpass filtering circuit comprises a dividing loop, the control circuit is configured to selectively activate the bandpass filtering circuit; when the control circuit is driven, the control circuit activates the bandpass filtering circuit so that the bandpass filtering circuit forms the dividing loop for the amplified input signal at a preset frequency according to the local oscillation signal.

3. The radio frequency receiving circuit according to claim 2, wherein the bandpass filtering circuit comprises a wave mixing circuit and a capacitor circuit, and an impedance of the wave mixing circuit and a capacitance of the capacitor circuit conform to the preset frequency.

4. The radio frequency receiving circuit according to claim 3, wherein the first amplification circuit comprises a front end amplification circuit and a coil circuit, the front end amplification circuit is configured to amplify the input signal and transmit the amplified input signal to the coil circuit, the coil circuit comprises a central tap, the capacitor circuit comprises a capacitor, the wave mixing circuit comprises a first transistor and a second transistor, a first end of the first transistor and a first end of the second transistor are coupled to two output ends of the coil circuit, respectively, the first end of the first transistor and the first end of the second transistor are configured to receive the amplified input signal from the two output ends of the coil circuit, a control end of the first transistor and a control end of the second transistor are coupled to the oscillation circuit and are configured to receive the local oscillation signal, a second end of the first transistor and a second end of the second transistor are coupled to two ends of the capacitor, respectively, and, when the control circuit is driven, the control circuit provides a first preset voltage for the control end of the first transistor, the control end of the second transistor, the second end of the first transistor, the second end of the second transistor, and the central tap so as to conduct the wave mixing circuit and the capacitor circuit and so that the wave mixing circuit and the capacitor circuit form the dividing loop.

5. The radio frequency receiving circuit according to claim 4, wherein when the control circuit is not driven, the control circuit provides the first preset voltage for the control end of the first transistor and the control end of the second transistor and provides a second preset voltage for the second end of the first transistor, the second end of the second transistor, and the central tap so as to cut off the dividing loop.

6. The radio frequency receiving circuit according to claim 4, wherein the capacitor circuit further comprises a first switch and a second switch, the second end of the first transistor is coupled to one of the two ends of the capacitor through the first switch, the second end of the second transistor is coupled to the other one of the two ends of the capacitor through the second switch, and, when the control circuit is driven, the control circuit further turns on the first switch and the second switch so as to conduct the wave mixing circuit and the capacitor circuit and so that the wave mixing circuit and the capacitor circuit form the dividing loop.

7. The radio frequency receiving circuit according to claim 6, wherein when the control circuit is not driven, the control circuit turns off the first switch and the second switch so as to cut off the dividing loop.

8. The radio frequency receiving circuit according to claim 7, wherein when the control circuit is not driven, the control circuit further provides the first preset voltage for the control end of the first transistor and the control end of the second transistor and provides a second preset voltage for the second end of the first transistor, the second end of the second transistor, and the central tap so as to cut off the dividing loop.

9. The radio frequency receiving circuit according to claim 1, wherein the frequency mixing and amplification circuit comprises:

a frequency mixing circuit configured to generate a second input signal according to the amplified input signal and the local oscillation signal; and a second amplification circuit coupled to the frequency mixing circuit and configured to amplify the second input signal.

10. The radio frequency receiving circuit according to claim 1, wherein the oscillation circuit comprises:

an oscillation source circuit configured to generate the local oscillation signal; and an oscillation amplification circuit coupled to the oscillation source circuit and configured to amplify the local oscillation signal.

11. A chip, comprising:

a radio frequency receiving circuit, comprising:

a first amplification circuit configured to amplify an input signal to generate an amplified input signal;

an oscillation circuit configured to provide a local oscillation signal;

a frequency mixing and amplification circuit coupled to the first amplification circuit and configured to perform frequency mixing and amplification on the amplified input signal according to the local oscillation signal so as to output a second input signal; and a dividing circuit coupled to a coupling point between the first amplification circuit and the frequency mixing and amplification circuit, wherein the dividing circuit is configured to form a dividing loop for the amplified input signal at a preset frequency according to the local oscillation signal when the dividing circuit is driven; and a main circuit configured to drive the dividing circuit when the second input signal is determined to comprise a signal of the preset frequency.

12. The chip according to claim 11, wherein the dividing circuit comprises a bandpass filtering circuit and a control circuit, the bandpass filtering circuit comprises a dividing loop, the control circuit is configured to selectively activate the bandpass filtering circuit; when the control circuit is driven, the control circuit activates the bandpass filtering circuit so that the bandpass filtering circuit forms the dividing loop for the amplified input signal at a preset frequency according to the local oscillation signal.

13. The chip according to claim 12, wherein the bandpass filtering circuit comprises a wave mixing circuit and a capacitor circuit, and an impedance of the wave mixing circuit and a capacitance of the capacitor circuit conform to the preset frequency.

14. The chip according to claim 13, wherein the first amplification circuit comprises a front end amplification circuit and a coil circuit, the front end amplification circuit is configured to amplify the input signal and transmit the amplified input signal to the coil circuit, the coil circuit comprises a central tap, the capacitor circuit comprises a capacitor, the wave mixing circuit comprises a first transistor and a second transistor, a first end of the first transistor and a first end of the second transistor are coupled to two output ends of the coil circuit, respectively, the first end of the first transistor and the first end of the second transistor are configured to receive the amplified input signal from the two output ends of the coil circuit, a control end of the first transistor and a control end of the second transistor are coupled to the oscillation circuit and are configured to receive the local oscillation signal, a second end of the first transistor and a second end of the second transistor are coupled to two ends of the capacitor, respectively, and, when the control circuit is driven, the control circuit provides a first preset voltage for the control end of the first transistor, the control end of the second transistor, the second end of the first transistor, the second end of the second transistor, and the central tap so as to conduct the wave mixing circuit and the capacitor circuit and so that the wave mixing circuit and the capacitor circuit form the dividing loop.

15. The chip according to claim 14, wherein when the control circuit is not driven, the control circuit provides the first preset voltage for the control end of the first transistor and the control end of the second transistor and provides a second preset voltage for the second end of the first transistor, the second end of the second transistor, and the central tap so as to cut off the dividing loop.

16. The chip according to claim 14, wherein the capacitor circuit further comprises a first switch and a second switch, the second end of the first transistor is coupled to one of the two ends of the capacitor through the first switch, the second end of the second transistor is coupled to the other one of the two ends of the capacitor through the second switch, and, when the control circuit is driven, the control circuit further turns on the first switch and the second switch so as to conduct the wave mixing circuit and the capacitor circuit and so that the wave mixing circuit and the capacitor circuit form the dividing loop.

17. The chip according to claim 16, wherein when the control circuit is not driven, the control circuit turns off the first switch and the second switch so as to cut off the dividing loop.

18. The chip according to claim 17, wherein when the control circuit is not driven, the control circuit further provides the first preset voltage for the control end of the first transistor and the control end of the second transistor and provides a second preset voltage for the second end of the first transistor, the second end of the second transistor, and the central tap so as to cut off the dividing loop.

19. The chip according to claim 11, wherein the frequency mixing and amplification circuit comprises:

a frequency mixing circuit configured to generate the second input signal according to the amplified input signal and the local oscillation signal; and a second amplification circuit coupled to the frequency mixing circuit and configured to amplify the second input signal.

20. The chip according to claim 11, wherein the oscillation circuit comprises:

an oscillation source circuit configured to generate the local oscillation signal; and an oscillation amplification circuit coupled to the oscillation source circuit and configured to amplify the local oscillation signal.

* * * * *